United States Patent
Dai et al.

(10) Patent No.: US 10,996,997 B2
(45) Date of Patent: May 4, 2021

(54) API-BASED SERVICE COMMAND INVOCATION

(71) Applicant: INTERNATIONAL BUSINESS MACHINES CORPORATION, Armonk, NY (US)

(72) Inventors: Jian Wu Dai, Beijing (CN); Yuan Yao Deng, Beijing (CN); Qian Dv Du, Beijing (CN); Xin Peng Liu, Beijing (CN); Xi Xq Qiao, Beijing (CN); Tao N. Zhang, Beijing (CN); Wu Mi Wm Zhong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 15/412,744

(22) Filed: Jan. 23, 2017

(65) Prior Publication Data
US 2018/0210768 A1 Jul. 26, 2018

(51) Int. Cl.
*G06F 9/54* (2006.01)
*G06F 8/36* (2018.01)
*G06F 8/30* (2018.01)

(52) U.S. Cl.
CPC .............. *G06F 9/541* (2013.01); *G06F 8/30* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 6,691,302 B1 | 2/2004 | Skrzynski et al. | |
| 7,280,995 B1* | 10/2007 | Sedlar | G06F 16/258 |
| 8,504,543 B1 | 8/2013 | Andreessen et al. | |
| 8,745,641 B1* | 6/2014 | Coker | G06F 11/3668 |
| | | | 719/313 |
| 9,026,587 B2 | 5/2015 | Johnston | |
| 9,158,729 B1* | 10/2015 | Joyce | G06F 13/00 |
| 9,294,543 B2 | 3/2016 | Hu et al. | |
| 9,942,277 B2* | 4/2018 | Lucovsky | H04L 63/0815 |
| 2007/0046996 A1* | 3/2007 | Matsuda | H04N 1/00196 |
| | | | 358/1.18 |

(Continued)

FOREIGN PATENT DOCUMENTS

WO 2011150818 A1 12/2011

OTHER PUBLICATIONS

IBM, "REST API commands", Nov. 18, 2015, pp. 1-2.*

(Continued)

*Primary Examiner* — Doon Y Chow
*Assistant Examiner* — Phuong N Hoang
(74) *Attorney, Agent, or Firm* — Brian Restauro; Matthew M. Hulihan; Heslin Rothenberg Farley & Mesiti PC

(57) ABSTRACT

API-based service command invocation is provided through a method that includes identifying one or more executable commands of a service. The one or more executable commands correspond to one or more service operations supported by the service. The method generates one or more application programming interfaces (APIs), each API of the one or more APIs to invoke a respective executable command of the one or more executable commands. The method exposes at least one API of the generated one or more APIs to an end-user of the service.

17 Claims, 7 Drawing Sheets

(56) References Cited

U.S. PATENT DOCUMENTS

| | | | | |
|---|---|---|---|---|
| 2007/0124366 | A1* | 5/2007 | Shobayashi | G06F 3/067 709/203 |
| 2012/0281698 | A1* | 11/2012 | Forster | H04L 45/38 370/392 |
| 2014/0215312 | A1* | 7/2014 | Hicks | G06F 16/95 715/235 |
| 2015/0074670 | A1* | 3/2015 | Gerganov | G06F 9/5027 718/103 |
| 2015/0381550 | A1* | 12/2015 | Mohammed | H04L 67/10 709/206 |
| 2016/0050263 | A1* | 2/2016 | Hwang | H04L 51/04 709/206 |
| 2016/0080493 | A1 | 3/2016 | Roth et al. | |
| 2016/0092173 | A1 | 3/2016 | Rodrigues et al. | |
| 2016/0147578 | A1* | 5/2016 | Biesack | G06F 9/541 719/328 |
| 2016/0173487 | A1* | 6/2016 | Griffith | H04L 63/101 713/156 |
| 2016/0197843 | A1* | 7/2016 | Palan | G06F 9/5072 709/226 |
| 2016/0226874 | A1* | 8/2016 | Wiest | H04L 63/0884 |
| 2016/0239274 | A1* | 8/2016 | Strachota | G06F 8/30 |
| 2016/0352867 | A1* | 12/2016 | Subbarayan | H04L 69/16 |
| 2017/0118247 | A1* | 4/2017 | Hussain | H04L 41/22 |
| 2018/0198839 | A1* | 7/2018 | Demulder | H04L 67/02 |

OTHER PUBLICATIONS

Couchbase, "Initial server setup using CLI or REST API", May 12, 2015, pp. 1-4.*

Follis, ("WevSphere Liberty and WebSphere Classic"), session 17366, pp. 1-51. (Year: 2015).*

Fokaefs, Marios, et al. "Using WADL Specifications to Develop and Maintain REST Client Applications", Published in Web Services (ICWS), 2015 IEEE International Conference, Jun. 27, 2015-Jul. 2, 2015, [Abstract retrieved on Jun. 28, 2016]. Retrieved from the Internet <URL: http://ieeexplore.ieee.org/xpl/login.jsp?tp=&arnumber=7195555&url=http%3A%2F%2Fieeexplore.ieee.org%2Fxpls%2Fabs_all.jsp%3Farnumber%3D7195555>, 2 pgs.

Fokaefs, Marios, et al. "Using WADL Specifications to Develop and Maintain REST Client Applications", Published in Web Services (ICWS), 2015 IEEE International Conference, Jun. 27, 2015-Jul. 2, 2015, pp. 81-88.

Jayathilaka, Hiranya. "Expose Any Shell Command or Script as a Web API", The Tech Feast—A Glimpse at the World of Computer Science, Saturday, Jun. 20, 2015, [retrieved on Jun. 28, 2016]. Retrieved from the Internet <URL: http://techfeast-hiranya.blogspot.com/2015/06/expose-any-shell-command-or-script-as.html>, 3 pgs.

Mell, Peter, et al., "The NIST Definition of Cloud Computing", NIST Special Publication 800-145, Sep. 2011, Gaithersburg, MD, 7 pgs.

* cited by examiner

API-BASED SERVICE COMMAND INVOCATION

BACKGROUND

There is an ever-increasing desire to publish software applications as a service for delivery to an end-user on the cloud. Given the large size and resource demand of many software offerings, it is common to provision such software in a virtual machine or other 'container'. However, in the cloud environment, customers may face difficulties in the ease-of-use of the software service. A new user may need training to understand where and how to run use the software on the cloud. Existing users may need to take the cumbersome steps of logging into a cloud virtual machine or using a virtual private network (VPN) to operate the software, such as to perform operations to start or stop an instance, or to collect log information. Furthermore, administrators may not be able to expose approved commands to end-users using a virtual machine or other container, instead resorting to complex security controls that limit usage of software services/commands. In addition, it may be difficult for users working with many different software services in the cloud to remember the login information and proper operations of each of these services.

SUMMARY

Shortcomings of the prior art are overcome and additional advantages are provided through the provision of a computer-implemented method. The method identifies one or more executable commands of a service. The one or more executable commands correspond to one or more service operations supported by the service. The method generates one or more application programming interfaces (APIs), each API of the one or more APIs to invoke a respective executable command of the one or more executable commands. The method exposes at least one API of the generated one or more APIs to an end-user of the service.

Further, a computer program product including a computer readable storage medium readable by a processor and storing instructions for execution by the processor is provided for performing a method. The method identifies one or more executable commands of a service. The one or more executable commands correspond to one or more service operations supported by the service. The method generates one or more application programming interfaces (APIs), each API of the one or more APIs to invoke a respective executable command of the one or more executable commands. The method exposes at least one API of the generated one or more APIs to an end-user of the service.

Yet further, a computer system is provided that includes a memory and a processor in communications with the memory, wherein the computer system is configured to perform a method. The method identifies one or more executable commands of a service. The one or more executable commands correspond to one or more service operations supported by the service. The method generates one or more application programming interfaces (APIs), each API of the one or more APIs to invoke a respective executable command of the one or more executable commands. The method exposes at least one API of the generated one or more APIs to an end-user of the service.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities for exposing application programming interfaces (APIs) to invoke executable commands of a software service. A software service can encompass a self-described interface accessible through a network. Exposing the APIs in accordance with aspects described herein exposes the service as a cloud service, though the service need not initially be provided as an existing cloud service or maintained in the cloud. In examples described herein, software services (such as a web application server, database, etc.) are maintained in a cloud environment and can be exposed to be cloud services by identifying executable commands from the service and exposing APIs for them.

Figure 1:
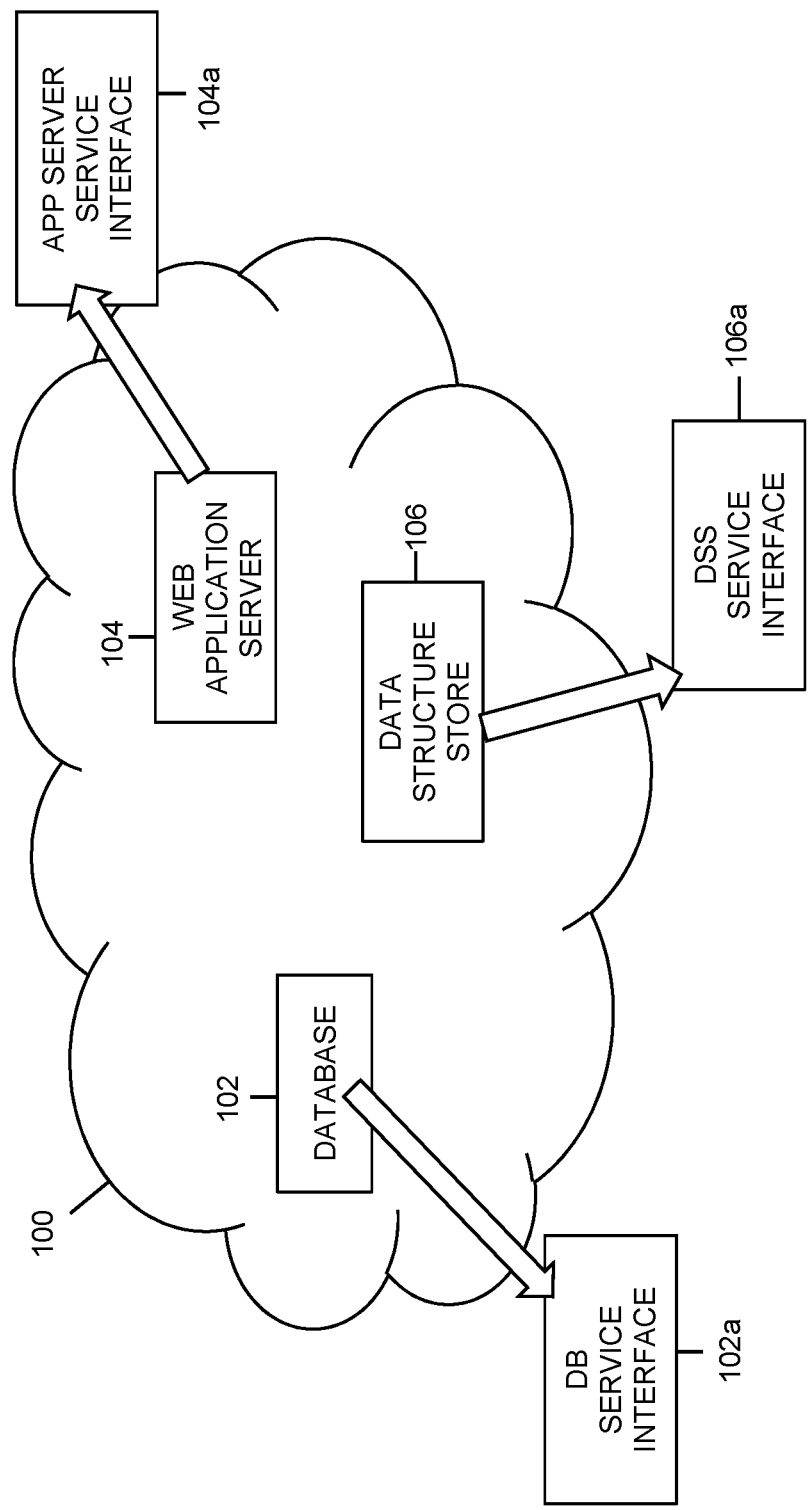
FIG. 1 illustrates an example cloud environment having a plurality of services.

FIG. 1 illustrates an example cloud environment having a plurality of services. Cloud environment 100 hosts (e.g. on computer systems as part of a cloud facility) services 102, 104, 106. Specifically, service 102 is a database service, such as the IBM DB2® on Cloud offering by International Business Machines Corporation, Armonk, N.Y., U.S.A. (of which DB2 is a registered trademark), service 104 is a web application server, such as a Web Sphere® Application Server offering by International Business Machines Corporation (of which WEBSPHERE is a registered trademark), and service 106 is a cloud-hosted data structure store. Each of the services 102, 104, 106 has a respective set of commands to invoke or execute respective service operations supported by the service. For instance, a web application server may have commands that allow administrators to install a web application, load the application, start and stop the application, modify application execution parameters, and so on. The execution of commands by an administrator or other user is typically, though not always, invoked through an operating console or similar interface. In FIG. 1, DB service interface 102a, app server service interface 104a, and DSS service interface are service interfaces for database 102, web application server 104, and data structure store 106, respectively, for execution of respective commands of each service. Service interfaces and the execution of commands via those interfaces can be complex and difficult to master. Consequently, this makes the proper use of the service complex. Facilities for more efficient and easier use, preferably cloud facilities for use in the cloud environment, are desired.

By scanning a service image, a list of all executable shell commands of the service can be collected. These commands exist for service operations. According to aspects described herein, a method generates an application programming interface (API), such as a representational state transfer (REST)-compliant API, for each of the detected commands and exposes the APIs to an end-user. The APIs may be exposed to a client application or other common REST (in this example) tool. For instance, if the client interacts with a web interface, the APIs may be exposed as JavaScript. Exposing the APIs to an end-user of the service provides security in that it no longer requires exposure of the operating console directly to an end-user; only the necessary APIs may be exposed to the given user, if desired.

In some examples, aspects described herein are implemented as a plugin to, e.g., a lightweight application server such as a Web Sphere® Liberty application server offered by International Business Machines Corporation. The plugin may be plugged during service provisioning. In some embodiments, the plugin converts a system shell command to a public REST API by generating an API to invoke the system shell command. Indications of existing shell commands for the service can be detected, for instance by examining file type and/or permissions of the files of the service. Example script extensions include .sh and .bat. Each discovered command and its corresponding path may be treated as the context path of the converted REST API. An appropriate command can be surrounded with modified template code, such as Java® code of the Java® technology offered by Oracle Corporation, Redwood City, Calif., U.S.A. (of which JAVA and ORACLE are registered trademarks) for running on an appropriate framework, such as the Java API for RESTful Web Services (JAX-RS) framework. A process converts the command line format for the command to a REST-compliant format, exposing the service on the backend server(s) for access from a network. In other examples, code in the python programming language is used in place of Java code.

Figure 2:
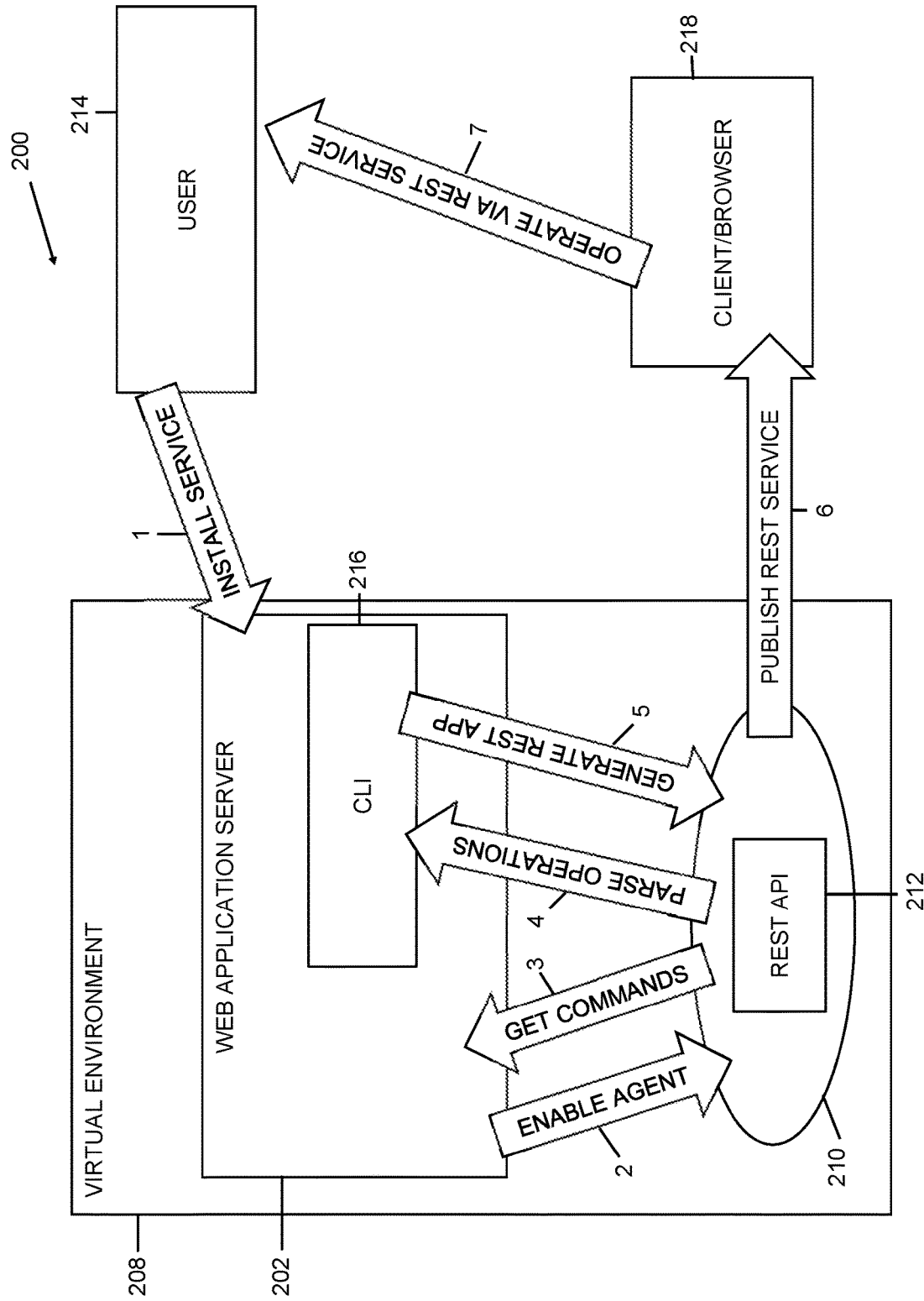
FIG. 2 depicts an example environment to incorporate and use aspects described herein.

Embodiments and examples are described and depicted further with reference to FIG. 2, which depicts an example environment to incorporate and use aspects described herein. In the environment 200 of FIG. 2, web application server 202 runs in a virtual environment 208, which may be one or more cloud servers hosted at a cloud facility, as an example. Web application server 202 is the target service that an administrator in this example would like to expose via APIs. An agent 210 (in this example running as a Liberty application server agent) discovers the commands of web application server 202 and publishes REST APIs 212 for invoking those commands, as explained in further detail below. Web application server 202 and agent 210 may run in any appropriate location and environment, such as a common server, server cluster, or cloud facility, or in separate facilities.

Initially at step 1, a user/administrator 214 installs the service, in this example a web application service of the web application server 202, as the target software service.

The connect agent 210 may also be installed and enabled as step 2 during this provisioning stage. For instance, a checkbox is added into the cloud service installation page. The user 214 can enable an 'API Connect' for the service by checking the box. Assuming the user selects to install the agent 210, the cloud framework can download an image of the agent and install the agent. In one example, this is facilitated by a repository that stores the agent code/image.

In particular examples, the process deploys the image as a virtual machine that connects to a backend server (e.g. web application server 202).

As step 3, the process uses the deployed agent to scan the software service, for instance the folders having the files of the service, to retrieve a list of commands. The process can identify commands of the service through any appropriate means. One approach is to check properties of each file. Properties can include file extension (.sh, .bat, .exe are all extensions uses for commands) or file permissions. A permissions value of '755' might suggest an executable file, for example. Additionally or alternatively, the process identifies commands based on whether a particular file extension type/name is registered to the operating system on which the service executes.

By way of specific example, an 'ls-la' command may be issued against a folder of service files, and the '.sh' files may be identified as the commands (e.g. addNode.sh, cleanupNode.sh, dumpNameSpace.sh, startNode.sh, startServer.sh, stonNode.sh, syncNode.sh, and versionInfo.sh.).

At step 4, the process parses each discovered command for usage and other information through a command line interface 216. The CLI 216 resides within the cloud, natively provided by web application server 202. Ultimately the command discovery is used to generate a collection of APIs as REST APIs 212 which may be bundled as a REST application. In accordance with these aspects, the process generates JAX-RS or other resource code for an API using a defined template as explained below. Many times the commands of a service are similar in terms of their invocation but differ in their parameters, making a template-based approach an appealing option.

The '-help' argument may be useful for obtaining the options list and usage of a particular command. Most executable commands support a "-help" or "-h" option that displays a description of the command's supported syntax and options. For a command that does not support the "-help" option, the process can attempt to run the command in order to drive an error message that reveals the kind of usage information that is normally displayed as the help information.

Thus, in some examples each command may be executed with a '-help' or '-h' parameter in order to obtain the command's help output message. An example help message includes the following parts:

Usage pattern, e.g.: Usage pattern is a substring of help documentation that starts with usage: (case insensitive) and ends with a visibly empty line. Each pattern can include the following elements: <arguments>, [ ], |, . . . .

Example: Usage: app_program <arguments>[-hso FILE] [--quiet|--verbose]

Option descriptions, e.g.: Option descriptions include a list of options that are put below usage patterns. Typically two spaces separate options with their informal description:
 -h --help display this help message
 -s --sorted sorted output
 -o FILE specify output file [default: ./test.txt]
 --quiet suppress compiler output
 --verbose be extra verbose Listing command option descriptions may be useful to identify:
 synonymous short and long options (starts with - or -- not counting spaces), e.g. '-h' or '-help'
 whether an option has an argument: put a word describing that argument after space (or equals "=" sign)
 whether the option's argument has a default value: [default: <my-default-value>]

Template resource code can be predefined and saved. The process can generate modified template code to confirm to the usage of a particular command. Input/output parameters of a command tailor the template code in order to generate the appropriate JAX-RS code (in this example). The template code modification can modify command name and command parameters for instance. Initially the process uses the template to generate initial code, for example by modifying the command name in the template code. The process also obtains usage information for the executable command, e.g. by the help command, and obtains the parameter list, which is then passed as the JAX-RS parameter list for further modification to the template resource code (adding the parameter list into the resource code). The process replaces the default parameter(s) in the template code and provides command usage description as a REST list description.

An example of generating JAX-RS resource code is provided for a startServer.sh command of a service. Example template resource code is as follows:

```
public class StartServerResource{
    @GET
    @Path("startServer")
        public String startServer(@QueryParam("parameters") String
            parameters)
{
    String result = " ";
    Runtime run = Runtime.getRuntime ( );
    try {
    Process p = run.exec("<tWAS Folder>/bin/startServer.sh" +
    parameters);
    BufferedInputStream in = new BufferedReader (new
    InputStreamReader(in));
    String lineStr;
    while ((lineStr − inBr.readline( )) != null)
    result += lineStr;
    if (p.waitFor( ) != 0) {
    if (p.exitValue( ) ==1)
    result = "Execute startServer error";
    }
    inBr.close( );
    in.close( );
    } catch (Exception e) {
    result = e.getMessage( );
    }
    return result;
    }
}
```

Further modification to the template above includes inserting the proper parameters identified by detecting usage of the command. For instance, the line:
   public String startServer(@QueryParam("parameters") String parameters)
  can change to:
   public String startServer (@PathParam("server") String server, @QueryParam ("h") String h, @QueryParam ("s") String s)
  Additionally, the line:
   Process p=run.exec("<tWAS Folder>/bin/start-Server.sh"+parameters)
  can change to:
   Process p=run.exec("<tWAS Folder>/bin/start-Server.sh"+server+h+s+o+quite, in order to call the command with the proper parameters.

After the process modified template code to conform to the usage pattern expected for the given command, the process can provide the code as a .java source file (in this example) as part of a package of .java files or any other desired file.

The process modified a set of template code for each of several commands of the service, to generate and deploy the REST APIs 212 in step 5. As part of this, the process packages the resulting REST (in this example) resources from the template-based resource code generation described above in an appropriate container or format usable by the agent. In this example, the agent is a lightweight application server and process packages the REST resources in a web application archive (.war) file. The process exports and displays the package as a generated REST application having REST APIs to the agent 210.

In examples, the agent discovers the REST resource without any separate coding or operation, such as via a plugin or discovery feature. The agent, after discovering the resources, exposes them on a unique API URL, for example. Thus, at step 6, the agent starts to provide/publish the REST API connect service to client software, such as a client program or browser (218).

In some embodiments, a web interface is provided for end-users to view the REST API list for one or more services and use this interface to invoke one of more of the APIs. Command details may also be provided from the REST endpoint description. The interface can, for instance, provide command details and/or help to guide the user in correct parameter usage. The agent can accumulate metadata for the REST service interface and publish a web user interface, which the user can leverage as a help or other tool to learn about how the interface is formed and how it can be invoked.

At runtime, a user operates the service (step 7) through the provided REST APIs by calling REST API(s) utilizing a web interface or other client software 218. The agent receives the request and parses it, then the API transforms the data from the request to a command-line compliant format for execution. The command line (as an example) executes the command, returns a result, and the agent passes the result back to the user, for instance in the client or browser interface 218 that the user uses to invoke the API. In this example, user 214 is the administrator who installed the service, though in other examples various users other than the administrator invoke the commands via the APIs.

In some examples, the process outputs to a user invoking one of the APIs the output from launching the command, including output regarding the status of the command, whether the command was executed, return results, etc.

As an enhancement, aspects provide executable command availability filtering. When provisioning the service or at another time, an administrator or other user can obtain virtual machine user account information and add an authentication check to the invocation of REST service(s). In a particular example, the process adds an authentication configuration in the REST application 212 and/or agent configuration by obtaining a cloud user's authorization. In a simple example, all available commands of a service are listed and an administrator selects which command(s) are exposed (i.e. which APIs are accessible) and which are not exposed for each user or usergroup. The configuration file can include a user column, listing users/groups, and a commands column. Each row corresponds to a particular user/group and the command(s) in the commands column of that row indicates the commands that the user/group has permissions to use and/or does not have permissions to use. When a user does not have access permissions to a command, access to the corresponding API that invokes the command is blocked, and the API is unavailable for view by the user. Additionally or alternatively, during runtime the processing can run a check with each API invocation to determine whether the invoking user has permission/privileges to invoke the command corresponding to the API. If not, the request may be denied.

Related to the above, a configuration file or other data structure can list the commands which are to be excluded in terms of API generation and/or invocation.

Aspects described herein enable the discovery of available console commands and exposure via a web-service. The allows a user to run/use software on the cloud without, for example, logging into the hosting virtual machine or knowing details about the software commands and their invocation. It also enables a cloud operator to expose only approved commands to the end-user without setting more complex security controls to limit end-user service/command usage. Cloud services providers may leverage these aspects to enhance their services and cloud integration.

Figure 3:
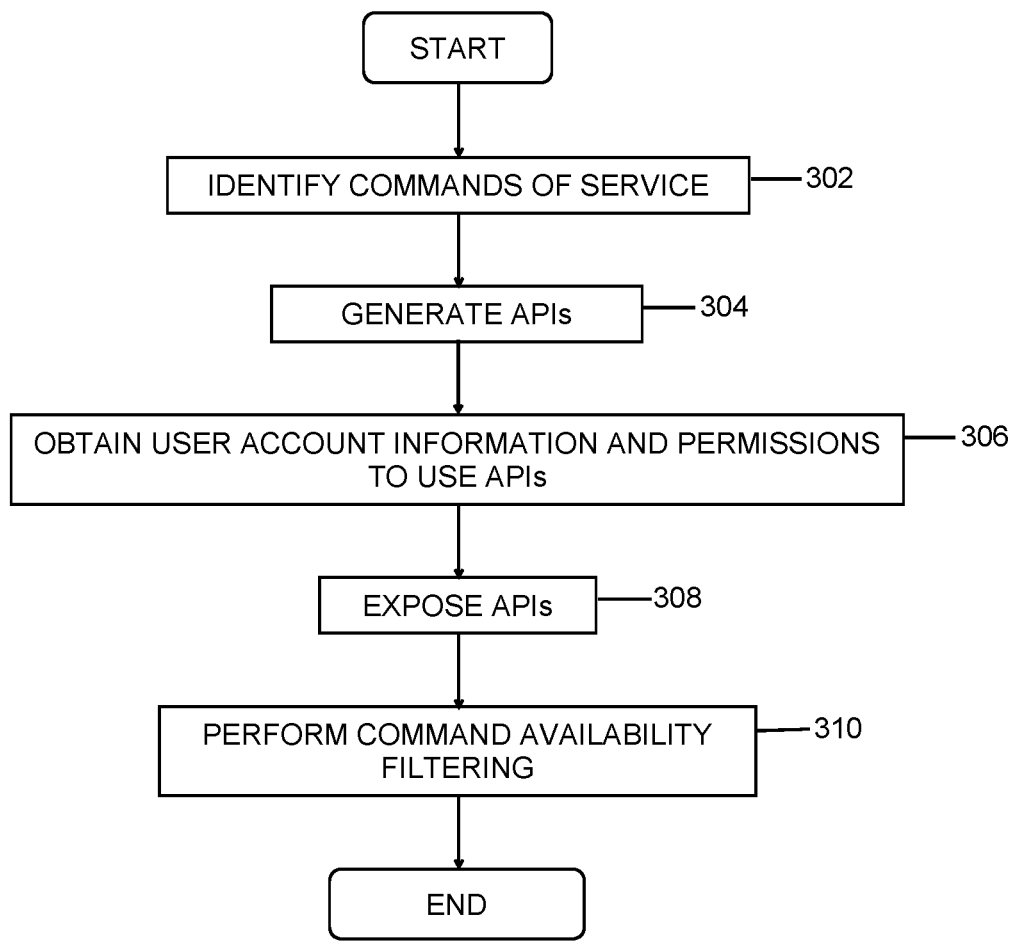
FIG. 3 depicts an example process for API-based service command invocation, in accordance with aspects described herein.

Accordingly, FIG. 3 depicts an example process for API-based service command invocation, in accordance with aspects described herein. In some examples, the process is performed by one or more computer systems, such as those described herein, which may include one or more cloud servers. Specifically, the process may be performed by agent software. In some examples, the process is performed after installing the agent, which may be a web application server agent. During provisioning of the service, a user, such as an administrator, performing the provisioning of the service can select an option to enable the web application server agent. Based on the user selecting the option to enable the web application server agent, an image of the web application server agent can be obtained and installed.

The process of FIG. 3 begins by identifying one or more executable commands of the service (302). The one or more executable commands can correspond to one or more service operations supported by the service. This identification of the executable commands(s) can be made by any of various techniques, such as by analyzing file properties (such as for file permissions 777, or particular file extension) of files of the service to identify the executable commands therefrom, and/or determining files of the service that are registered with an operating system on which the service runs to identify the executable commands.

The process continues by generating one or more application programming interfaces (APIs) (304). Each such API of the one or more APIs can be to invoke a respective executable command of the one or more executable commands. The one or more APIs can be representational state transfer (REST) APIs. The generating in this case converts a first command format for the executable command, the first command format supported by the service, into a web API format, the web API format being a REST-compliant format.

The process obtains, during service provisioning of the service for instance, user account information of end-users of the service (306). The user account information can indicate which end-users can use which APIs of the generated one or more APIs.

The process exposes at least one API of the generated one or more APIs to an end-user of the service (308). As noted, the identifying, generating, and exposing may be performed by a web application server agent activated during service provisioning of the service. The APIs may be exposed by the agent based on installing the web application server agent. The exposure may provide, as part of the web application server agent, an API web application including executable code of the generated APIs.

The exposed at least one API may be one or more APIs to which it is determined that the user has access. Thus, the process performs executable command availability filtering (310) including controlling access by the end-user to the generated one or more APIs. The controlling includes enabling access by the end-user to the at least one generated API and denying access by the end-user to at least one other API of the generated one or more APIs. The controlling access may be based on a portion of the obtained user account information (e.g. 306) corresponding to the end-user.

Figure 4:
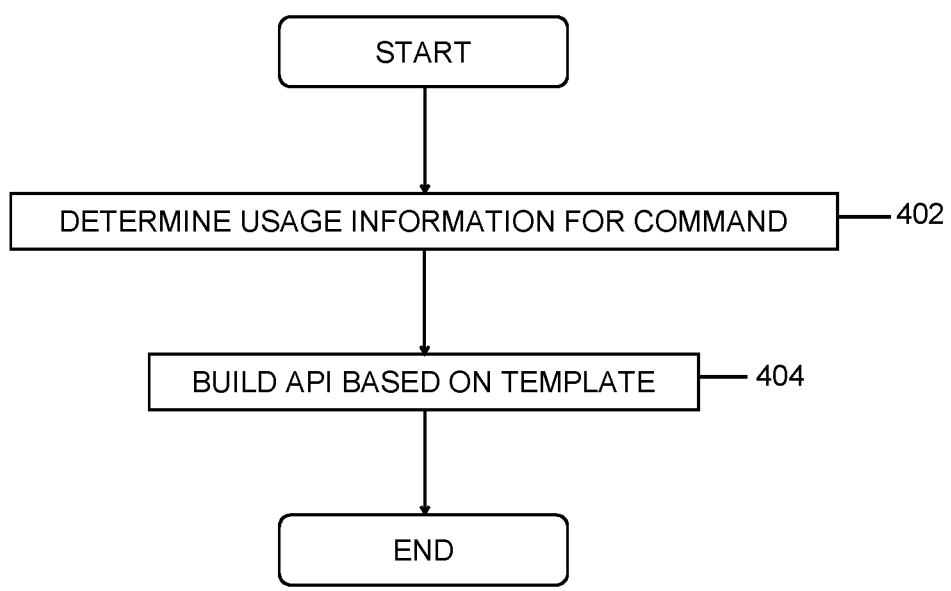
FIG. 4 depicts an example process for generating an application programming interface, in accordance with aspects described herein.

FIG. 4 depicts an example process for generating an API, in accordance with aspects described herein. In some examples, the process is performed by an agent. The API may be generated and configured to invoke an executable command of one or more executable commands of a service. The process includes determining usage information for the executable command (402). The usage information includes a usage pattern expected for the executable command, the usage pattern including usage parameters, and available options for the usage parameters. The process then builds the API from template code (404). For instance, the process builds the API from template resource code, where the building includes modifying the template code to conform to the usage pattern expected for the command. As part of building the API based on the template, the process configures the API to support availability of the usage parameters and available options to the end-user, and to provide the executable command to the service in adherence to the usage pattern, for instance by constructing it with proper syntax that the service recognizes).

Although various examples are provided, variations are possible without departing from a spirit of the claimed aspects.

Figure 5:
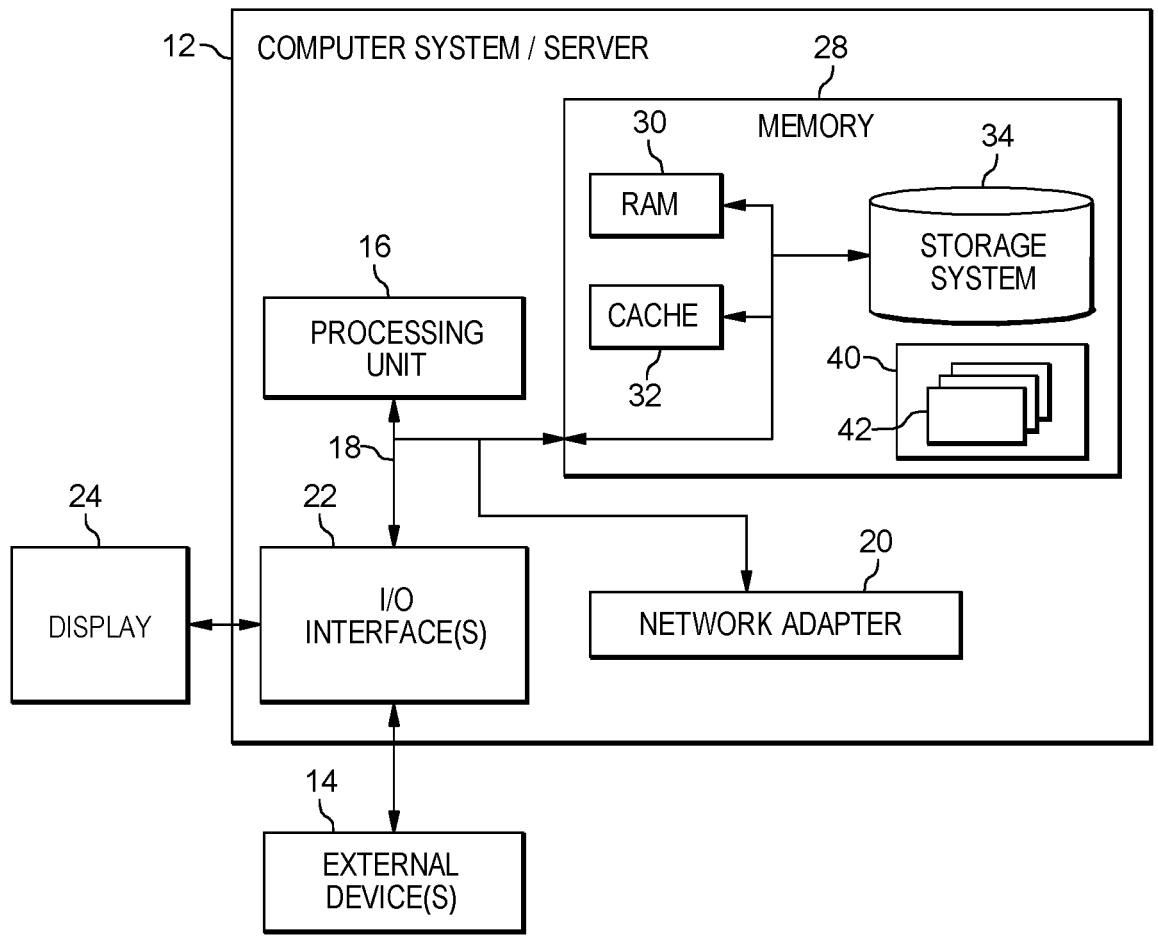
FIG. 5 depicts one example of a computer system and associated devices to incorporate and/or use aspects described herein.

Processes described herein may be performed singly or collectively by one or more computer systems, such as one or more cloud servers or backend computers (e.g. one or more social network servers), home network servers, smart device or other network-connected devices, or a combination of the foregoing. FIG. 5 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 5, a computing environment 500 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controller set top boxes, programmable consumer electronics, smart devices, intelligent home devices, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense light, ambient temperature, levels of material), activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
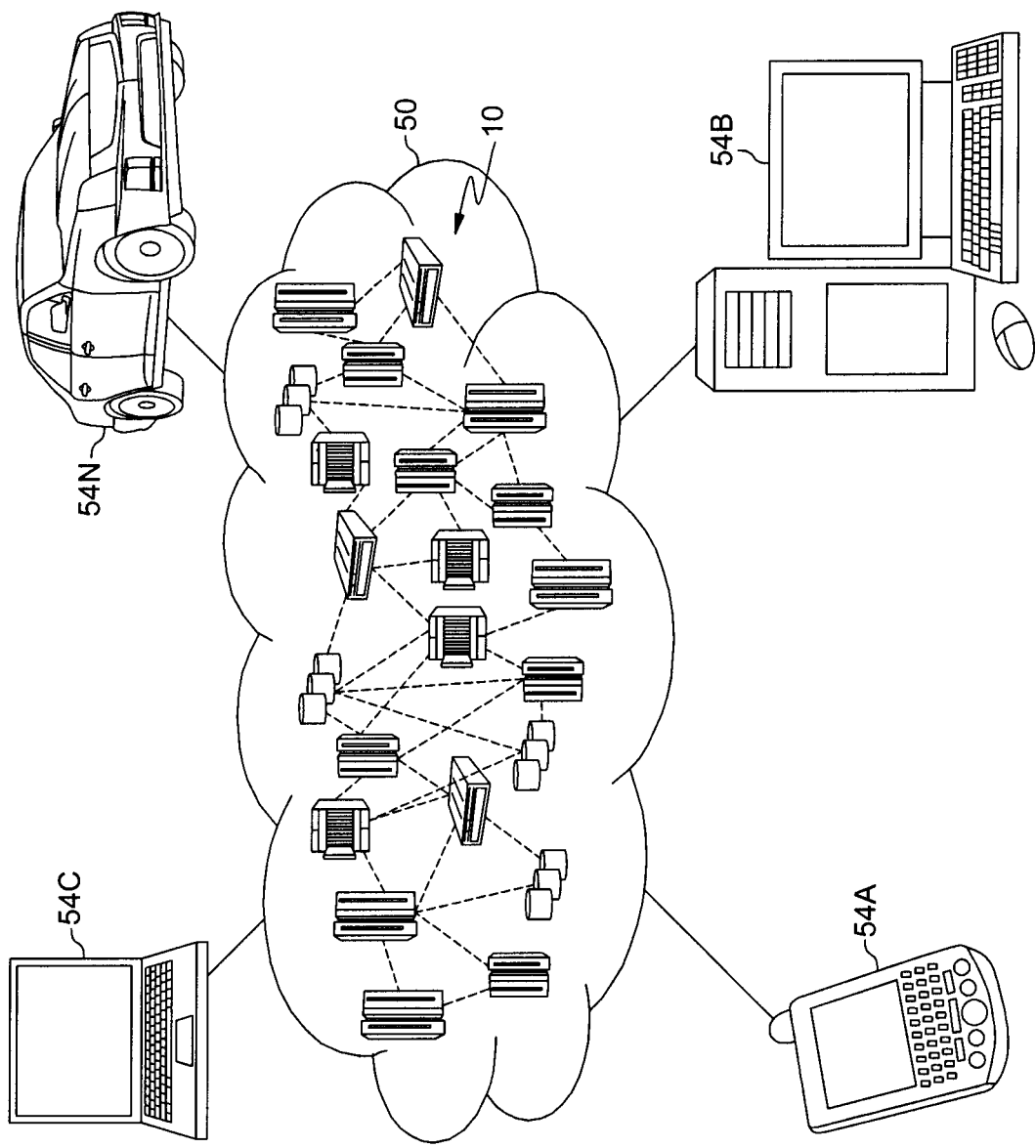
FIG. 6 depicts one embodiment of a cloud computing environment.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
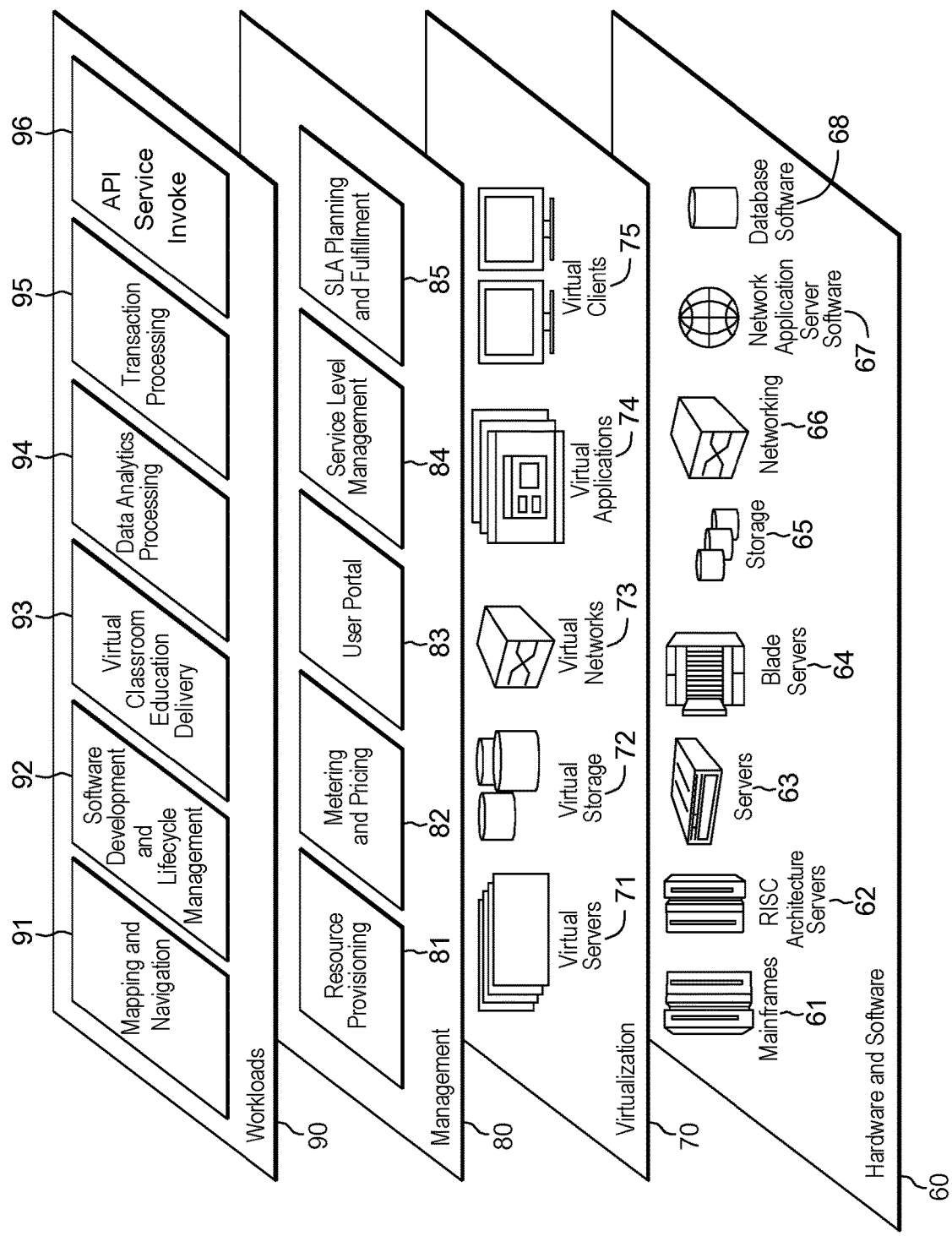
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API-based service command invocation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    discovering executable command line commands of a hosted service by scanning, via a deployed application server agent, one or more files of the hosted service, the hosted service being hosted on a backend server, the executable command line commands corresponding to service operations supported by the service, and the backend server configured to execute the command line commands based on invocation thereof via input to a command line interface of the backend sever, wherein, as part of discovering the executable command line commands, the scanning includes checking file extension types of the one or more files and determining whether a particular file extension type is registered to an operating system on which the hosted service executes as being an extension for executable commands;
    generating application programing interfaces (APIs) for the discovered executable command line commands, the generating the APIs comprising generating a respective API for each executable command line command discovered as part of the discovering, each API of the generated APIs being a different interface between users and the executable command line command, of the executable command line commands, associated with that API, wherein each API of the generated APIs is configured for calling to invoke processing that provides the respective executable command line command, of the executable command line commands, to the service hosted on the backend server and invokes execution of the respective executable command line command;
    based on generating the APIs, exposing at least one API of the generated APIs to an end-user of the service for calling by the end-user to invoke the processing that provides the respective executable command line command associated with a called API of the at least one API to the service and invokes execution of the respective executable command line command; and
    performing executable command line command availability filtering by controlling access by the end-user to the generated APIs, the controlling comprising enabling access by the end-user to the at least one API of the generated APIs and denying access by the end-user to at least one other API of the generated APIs.

2. The method of claim 1, wherein the APIs are representational state transfer (REST) APIs, and wherein the generating converts a first command invocation format for the executable command line command, the first command invocation format supported by the service, into a web API invocation format, the web API invocation format being a REST-compliant format.

3. The method of claim 1, wherein the generating an API, of the APIs, to invoke an executable command line command of the executable command line commands comprises:
    determining usage information for the executable command line command, the usage information including a usage pattern expected for the executable command line command, the usage pattern comprising usage parameters, and available options for the usage parameters; and
    configuring the API to support availability of the usage parameters and available options to the end-user, and to provide the executable command line command to the service in adherence to the usage pattern.

4. The method of claim 3, wherein the generating the API further comprises building the API from template resource code, the building comprising modifying the template code to conform to the usage pattern expected for the executable command line command.

5. The method of claim 1, wherein the discovering, generating, and exposing are performed by the deployed application server agent, the deployed application server agent being a web application server agent activated during service provisioning of the service.

6. The method of claim 5, further comprising:
providing to a user during provisioning of the service an option to enable the web application server agent; and
based on the user selecting the option to enable the web application server agent, obtaining an image of the web application server agent and installing the web application server agent from the image.

7. The method of claim 6, further comprising based on installing the web application server agent, providing as part of the web application server agent an API web application comprising executable code of the generated APIs.

8. The method of claim 1, wherein the discovering comprises at least one selected from the group consisting of: analyzing file properties of files of the service to identify the executable command line commands therefrom, or determining files of the service that are registered with an operating system on which the service runs to identify the executable command line commands.

9. The method of claim 1, further comprising obtaining, during service provisioning of the service, user account information of end-users of the service, the user account information indicating which end-users can use which APIs of the generated one or more APIs, wherein the controlling access is based on a portion of the obtained user account information corresponding to the end-user.

10. A computer system comprising:
a memory; and
a processor in communication with the memory, wherein the computer system is configured to perform a method comprising:
discovering executable command line commands of a hosted service by scanning, via a deployed application server agent, one or more files of the hosted service, the hosted service being hosted on a backend server, the executable command line commands corresponding to service operations supported by the service, and the backend server configured to execute the command line commands based on invocation thereof via input to a command line interface of the backend sever, wherein, as part of discovering the executable command line commands, the scanning includes checking file extension types of the one or more files and determining whether a particular file extension type is registered to an operating system on which the hosted service executes as being an extension for executable commands;
generating application programing interfaces (APIs) for the discovered executable command line commands, the generating the APIs comprising generating a respective API for each executable command line command discovered as part of the discovering, each API of the generated APIs being a different interface between users and the executable command line command, of the executable command line commands, associated with that API, wherein each API of the generated APIs is configured for calling to invoke processing that provides the respective executable command line command, of the executable command line commands, to the service hosted on the backend server and invokes execution of the respective executable command line command;
based on generating the APIs, exposing at least one API of the generated APIs to an end-user of the service for calling by the end-user to invoke the processing that provides the respective executable command line command associated with a called API of the at least one API to the service and invokes execution of the respective executable command line command; and
performing executable command line command availability filtering by controlling access by the end-user to the generated APIs, the controlling comprising enabling access by the end-user to the at least one API of the generated APIs and denying access by the end-user to at least one other API of the generated APIs.

11. The computer system of claim 10, wherein the APIs are representational state transfer (REST) APIs, and wherein the generating converts a first command invocation format for the executable command line command, the first command invocation format supported by the service, into a web API invocation format, the web API invocation format being a REST-compliant format.

12. The computer system of claim 10, wherein the generating an API, of the APIs, to invoke an executable command line command of the executable command line commands comprises:
determining usage information for the executable command line command, the usage information including a usage pattern expected for the executable command line command, the usage pattern comprising usage parameters, and available options for the usage parameters; and
configuring the API to support availability of the usage parameters and available options to the end-user, and to provide the executable command line command to the service in adherence to the usage pattern.

13. The computer system of claim 12, wherein the generating the API further comprises building the API from template resource code, the building comprising modifying the template code to conform to the usage pattern expected for the executable command line command.

14. The computer system of claim 10, wherein the discovering, generating, and exposing are performed by the deployed application server agent, the deployed application server agent being a web application server agent activated during service provisioning of the service, and wherein the method further comprises:
providing, to a user provisioning the service, an option to enable the web application server agent;
based on the user selecting the option to enable the web application server agent, obtaining an image of the web application server agent and installing the web application server agent from the image; and
based on installing the web application server agent, providing as part of the web application server agent an API web application comprising executable code of the generated APIs.

15. A computer program product comprising:
a computer readable storage medium readable by a processing circuit and storing instructions for execution by the processing circuit for performing a method comprising:
discovering executable command line commands of a service by scanning, via a deployed application server agent, one or more files of the hosted service, the hosted service being hosted on a backend server, the executable command line commands corresponding to service operations supported by the service, and the backend server configured to execute the command line commands based on invocation thereof via input to a command line interface of the backend sever, wherein, as part of discovering the executable command line commands, the scanning includes checking file extension types of the one or more files and determining whether a particular file extension type is registered to an operating system on which the hosted service executes as being an extension for executable commands;

generating application programing interfaces (APIs) for the discovered executable command line commands, the generating the APIs comprising generating a respective API for each executable command line command discovered as part of the discovering, each API of the generated APIs being a different interface between users and the executable command line command, of the executable command line commands, associated with that API, wherein each API of the generated APIs is configured for calling to invoke processing that provides a respective executable command line command, of the executable command line commands, to the service hosted on the backend server and invokes execution of the respective executable command line command;

based on generating the APIs, exposing at least one API of the generated APIs to an end-user of the service for calling by the end-user to invoke the processing that provides the respective executable command line command associated with a called API of the at least one API to the service and invokes execution of the respective executable command line command; and performing executable command line command availability filtering by controlling access by the end-user to the generated APIs, the controlling comprising enabling access by the end-user to the at least one API of the generated APIs and denying access by the end-user to at least one other API of the generated APIs.

16. The computer program product of claim 15, wherein the APIs are representational state transfer (REST) APIs, and wherein the generating converts a first command invocation format for the executable command line command, the first command invocation format supported by the service, into a web API invocation format, the web API invocation format being a REST-compliant format.

17. The computer program product of claim 15, wherein the generating an API, of the APIs, to invoke an executable command line command of the executable command line commands comprises:

determining usage information for the executable command line command, the usage information including a usage pattern expected for the executable command line command, the usage pattern comprising usage parameters, and available options for the usage parameters; and configuring the API to support availability of the usage parameters and available options to the end-user, and to provide the executable command line command to the service in adherence to the usage pattern;

and wherein the generating the API further comprises building the API from template resource code, the building comprising modifying the template code to conform to the usage pattern expected for the executable command line command.

* * * * *